United States Patent [19]

Pinder, III

[11] Patent Number: 5,049,287
[45] Date of Patent: Sep. 17, 1991

[54] OIL SPILL RECOVERY METHOD AND APPARATUS

[76] Inventor: Robert F. Pinder, III, 18 Woodland Ct., Novato, Calif. 94947

[21] Appl. No.: 563,449

[22] Filed: Aug. 7, 1990

[51] Int. Cl.[5] ............................................. E02B 15/04
[52] U.S. Cl. ..................................... 210/776; 210/923
[58] Field of Search ...................... 210/242.3, 776, 923; 114/125

[56] References Cited

U.S. PATENT DOCUMENTS 3,529,720 9/1970 Chablaix .............................. 210/776
3,756,294 9/1973 Rainey .............................. 210/242.3
3,938,274 2/1976 Seymour .............................. 114/125

Primary Examiner—Stanley Silverman
Assistant Examiner—Christopher Upton
Attorney, Agent, or Firm—Larry D. Johnson

[57] ABSTRACT

The oil spill recovery method and apparatus of this invention provides an adaptive device to modify the function of an existing tank vessel into an oil recovery vessel. The apparatus comprises an adaptor member conditioned for attachment to the below-waterline vent or seachest normally used to flood the ship's tanks with water, thereby enabling the pumping of the spilled oil into the recovery ship's tank.

8 Claims, 5 Drawing Sheets

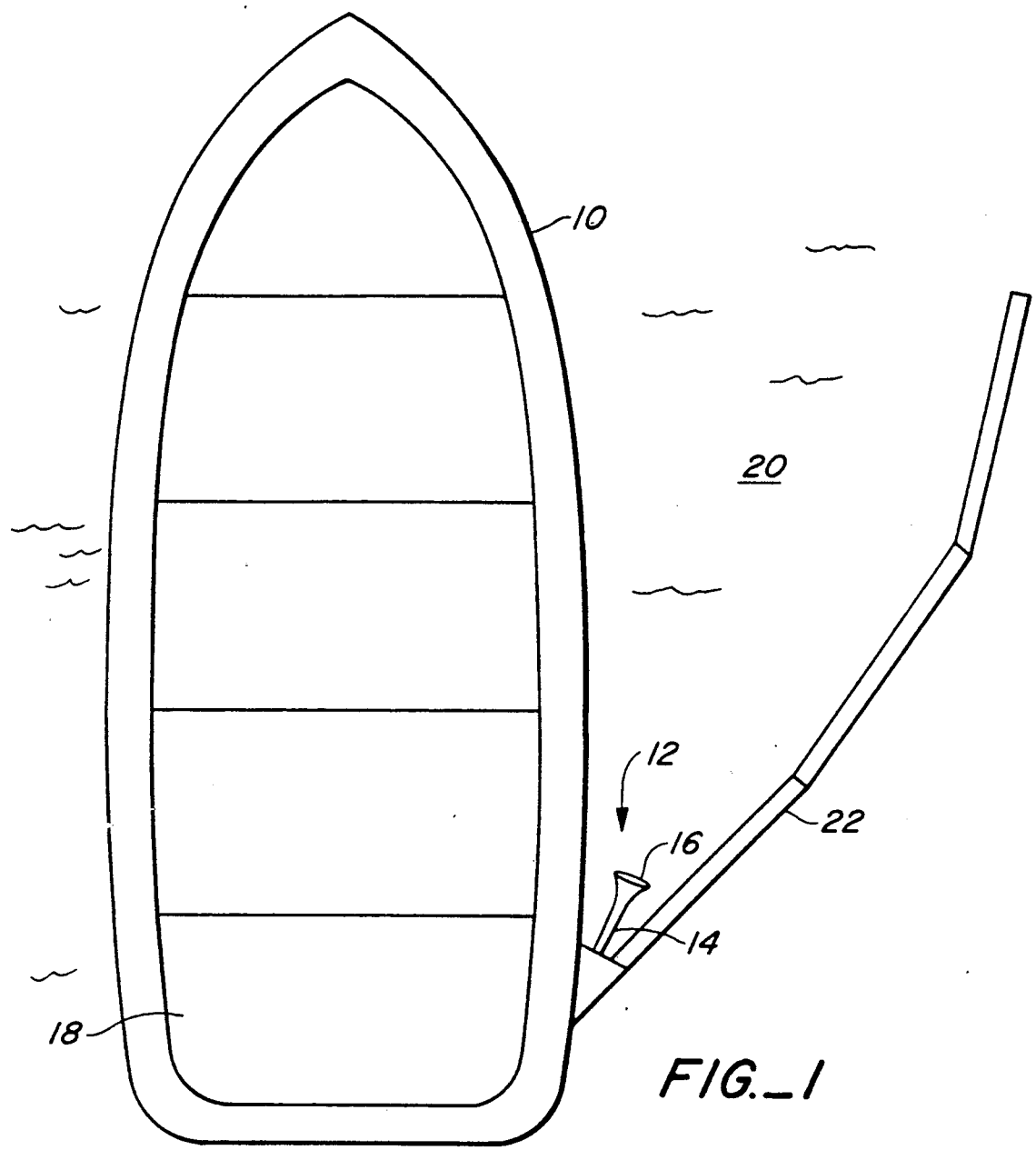
FIG._1
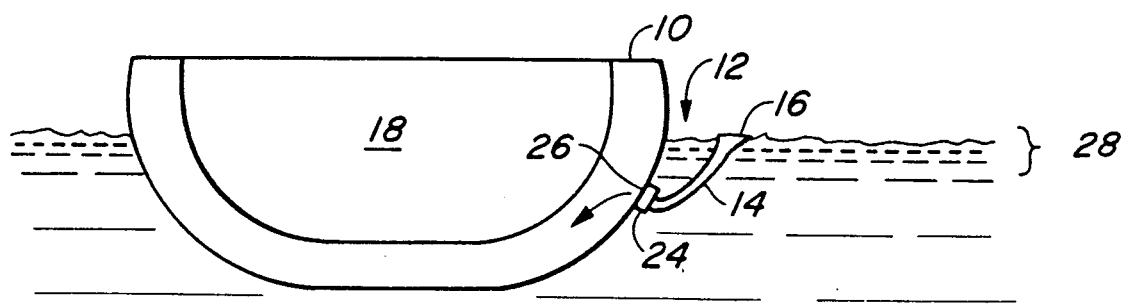
FIG._2

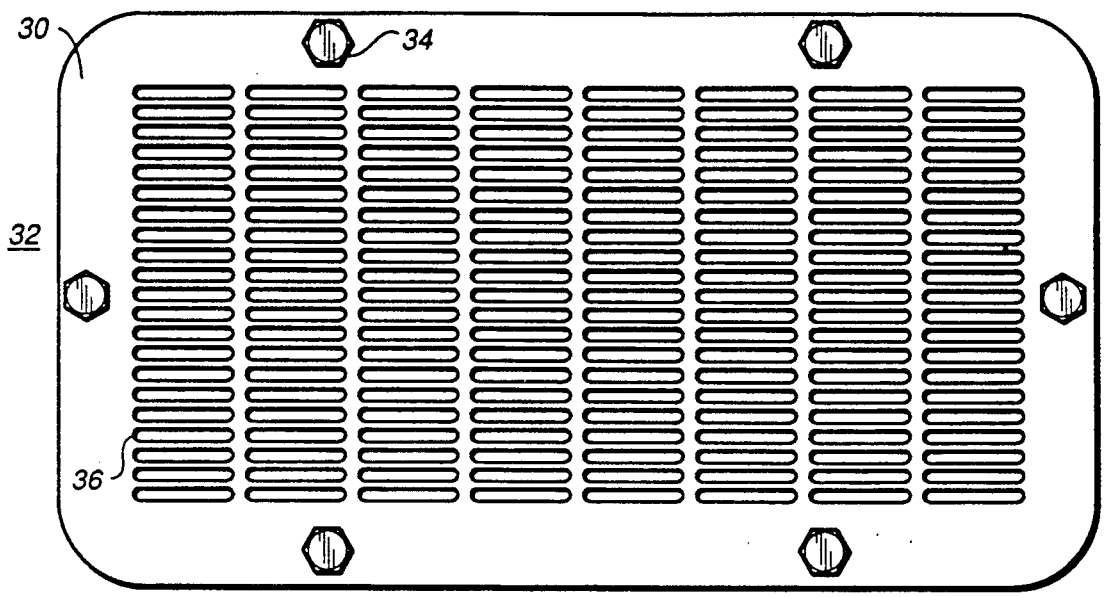
FIG._3
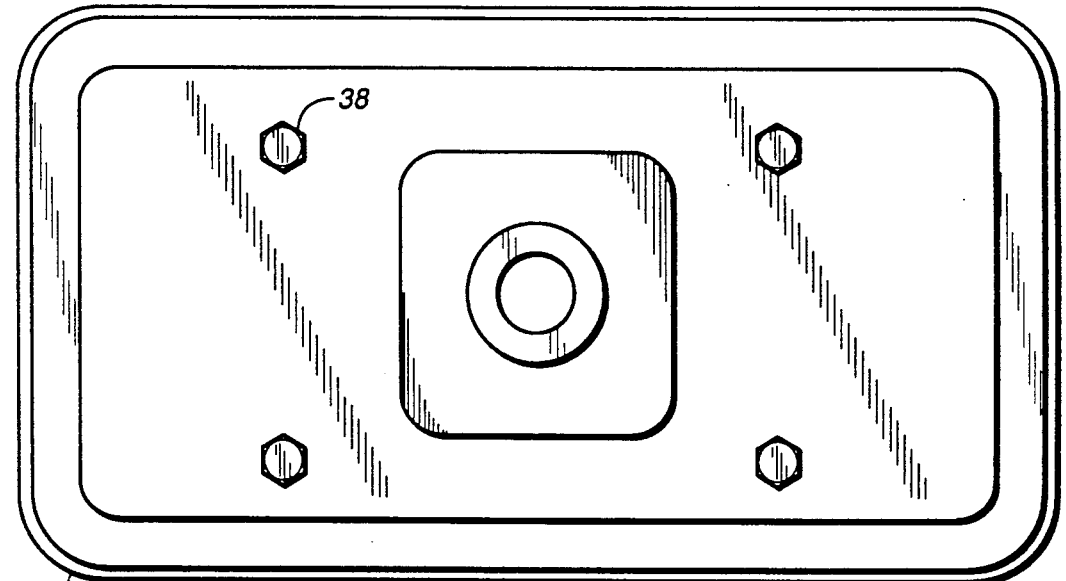
FIG._4
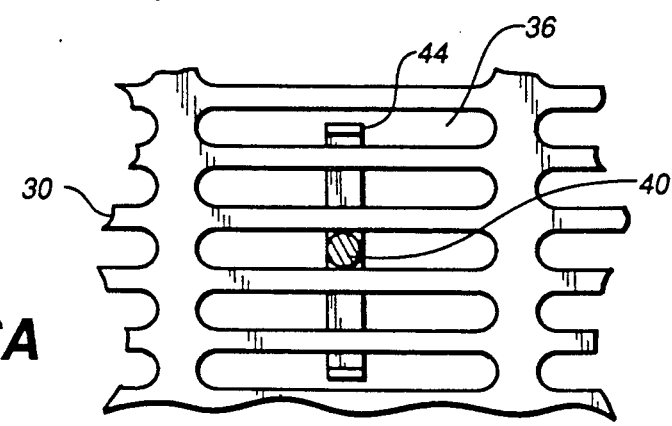
FIG._6A

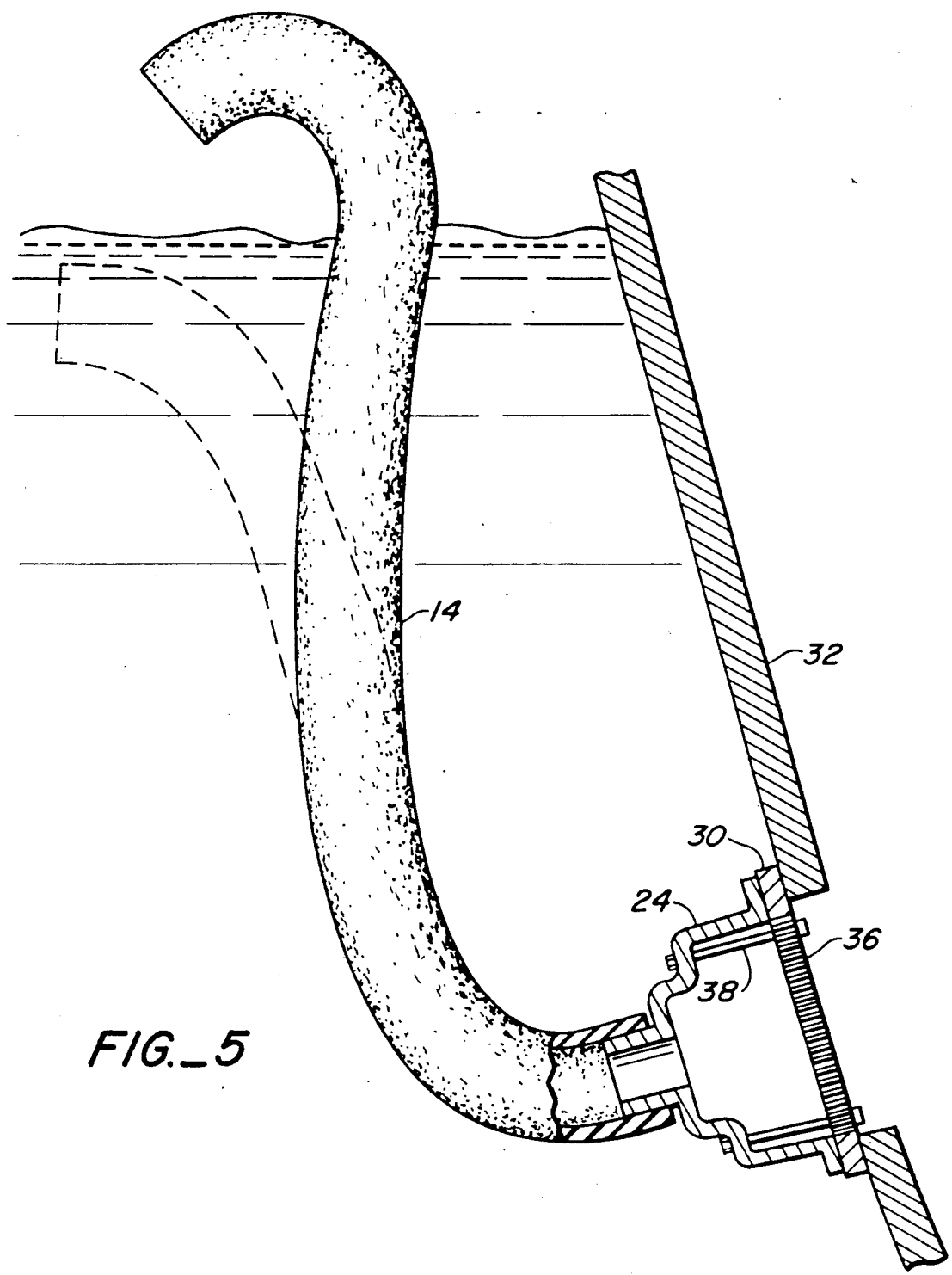
FIG._5

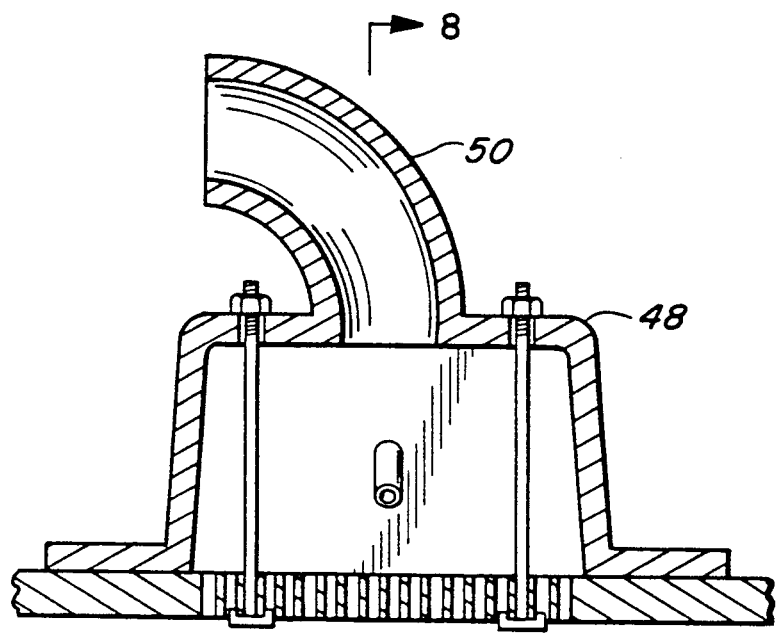
FIG._7
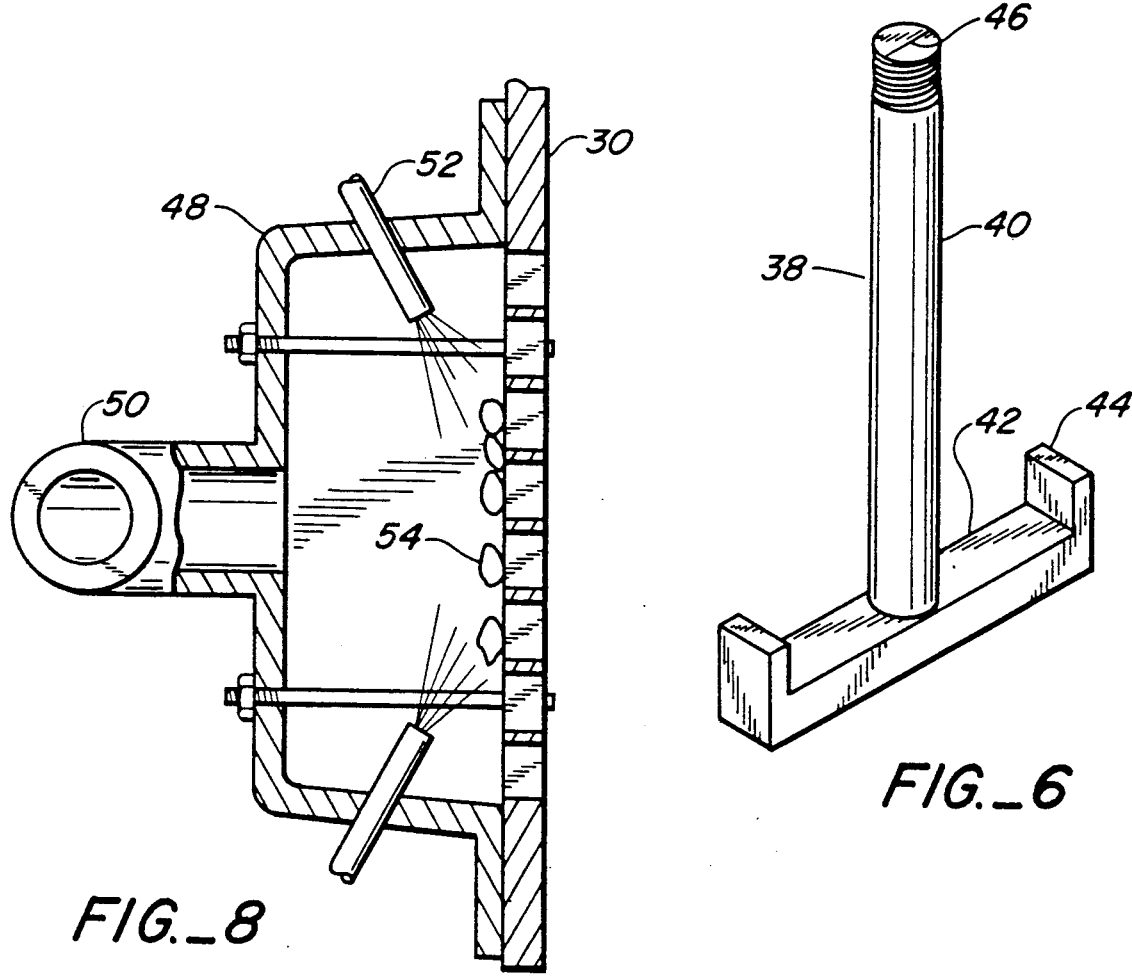
FIG._8
FIG._6

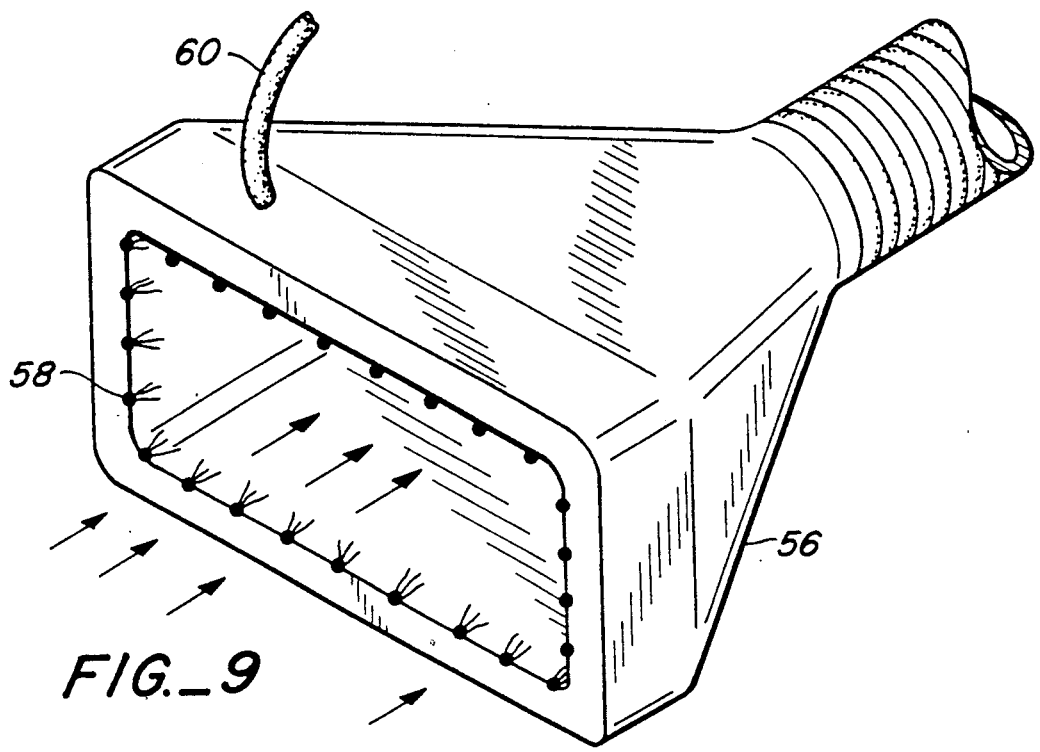
FIG._9
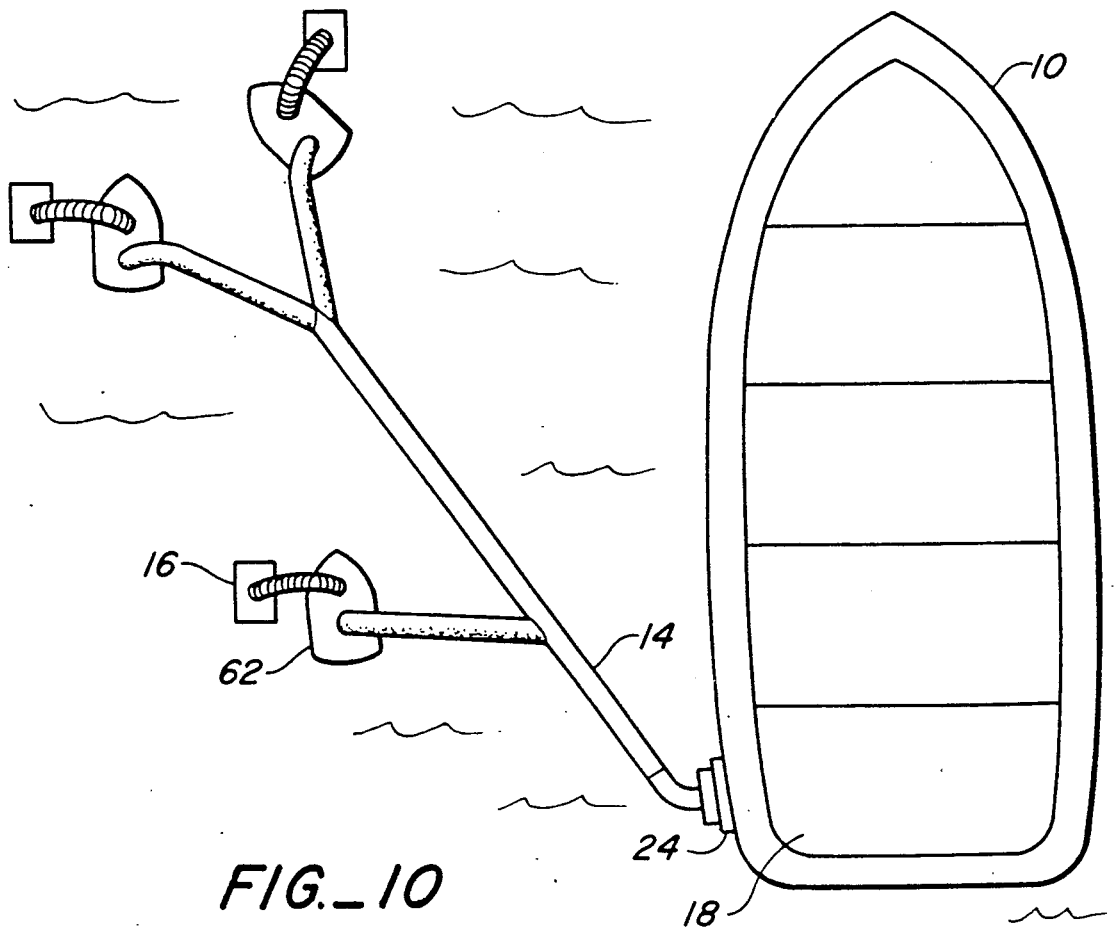
FIG._10

OIL SPILL RECOVERY METHOD AND APPARATUS

BACKGROUND OF THE INVENTION

1. Field of the Invention

This invention relates generally to tank vessels, and more specifically to an improved method and apparatus for oil spill recovery by such vessels.

2. Description of the Prior Art

Large oil spills can originate from many sources; grounded tankers, sunken tankers, oil rigs, oil well caps, underwater pipelines, leaking ground fissures, shore tank failures, and the like. Unfortunately, the present methods of oil spill recovery have many limitations. They evolved on the premise of limited pump capacity and limited storage capacity of oil spill recovery vessels, and hence yield a limited recovery rate. The equipment presently used attempts to separate the oil from the water prior to being pumped to the storage spaces aboard recovery vessels. The methods presently used require separating debris from the oil prior to transferring to the storage tanks because the pumps used are not capable of moving large quantities of solid material. Additionally, the present technology typically has a maximum operating sea condition of sea state 3 (relatively calm waters).

These present techniques were designed primarily to handle the numerous small spills that occur each year. But they are woefully inadequate to cope with the aftermath of a major spill (e.g., 100,000+ gallons). This was recently evidenced in U.S. waters by the sequence of events following the grounding and oil spill of the "Exxon Valdez", and major refinery spills in the waters of Mississippi and Arthur Kill rivers.

Accordingly, an object of this invention is to provide a device that can quickly recover large quantities of oil in the water, be easily deployed and is environmentally safe.

A further object of this invention is to provide an oil spill recovery device that is cost effective and available in all corners of the globe.

A further object of this invention is to provide an acceptable method of disposal of oil collected from oil spills or other marine casualties.

A further object of this invention is to provide a method to extract oil from tank vessels which have become disabled due to casualties which render the vessel's engine room incapable of supplying power to the pumps.

SUMMARY OF THE INVENTION

The oil spill recovery method and apparatus of this invention provides an adaptive device to modify the function of an existing tank vessel into an oil recovery vessel. The apparatus comprises an adaptor member conditioned for attachment to the below-waterline vent or seachest normally used to flood the ship's tanks with water, thereby enabling the pumping of the spilled oil into the recovery ship's tanks.

Most tank vessels have a pipeline connection from their cargo pumps through the hull to the surrounding water. This is usually accomplished via a set of valves in the pumproom. The hull penetration is commonly called a seachest or sea suction, and is usually fitted with a strainer plate to prevent the intake of debris when suctioning water into the tank vessel. The size of the seachest is dependent on the dimensions of the tank vessel and its capacity. For example, a 300 foot barge (1 million gallon capacity) may have an 8 inch seachest pipe inlet, while an 800 foot tanker (20 million gallon capacity) may have a 16 inch seachest pipe inlet. The seachest allows a tank vessel to suction liquid from the sea into its cargo tanks. Conversely, the seachest allows a tank vessel to discharge liquid from its tanks into the surrounding body of water. The movement of liquid through the seachest may be accomplished with pumps or gravity depending on the draft of the vessel and/or the height of liquid in the tank(s) to be used.

The principal focus of this invention is to attach an adaptive device to the seachest which will then allow the tank vessel to utilize its high capacity cargo pumps for the recovery of oil. This method of oil recovery need not be as efficient as prior art oil recovery methods (which must be concerned with recovering only oil, and reducing the amount of water collected) because of the large volumetric capacity of the tank vessel. For example, a recovered mixture of only 10% oil will be acceptable and still yield greater recovery rates than are possible with present methods and techniques.

As each tank vessel becomes full of oil/water mixture it is then replaced with an empty tank vessel, similarly equipped with the adaptive device of this invention, which is ready to assume recovery operations. When the tank vessel is full, it can then move away from the area and decant the water from the oil/water mixture; this will allow the tank vessel to return for continued oil recovery operations or proceed to a designated port to discharge the oil recovered. This allows large quantities of recovered oil to be transported to a facility equipped for waste oil reclamation.

Presently, I propose that the seachest adaptor device be installed by a scuba diver. In the future, I expect that tank vessels will be constructed in such a manner to allow easier installation of this device, possibly without a diver's assistance. Alternatively, the adaptive device may be installed in the original construction, or permanently retrofit into existing vessels. As a still further alternative, an existing ship's seachest strainer plate could be permanently removed, and the adaptive device permanently attached in its place.

Once the device is in place, the tank vessel is capable of removing, extracting or recovering liquids in a variety of situations; fractured structures, containment barriers, oil booms, shore tanks, sunken vessels, grounded vessels, vessels adrift, and oil spills in harbors, rivers, or in open waters:

A. Fractured structures: The suction end of the hose can be positioned on or near the fracture. Alternatively, the method could be used for evacuating the oil/water from a boom enclosing a fractured vessel or structure (such as an oil pipeline leak at a dock or wharf).

B. Containment barriers/oil booms: Removal of oil from behind containment barriers.

C. Shore tanks or their containment dikes: The suction end of the hose can be used to remove oil from a shore tank that has developed a fracture.

D. Sunken vessels: The suction end can be attached to or suspended over a sunken vessel to remove the oil remaining in cargo tanks or bunker tanks.

E. Grounded vessels: The suction end can be attached to a grounded vessel. Alternatively, the suction end can be used to remove the oil contained within an oil containment boom around a grounded vessel.

F. Vessel adrift: A vessel adrift may not be able to discharge its oil cargo due to loss or reduction of power. If both vessels have this device attached to their respective seachests, then assist tank vessels could remove the oil cargo from the vessel in distress. Once the vessel in distress has its cargo removed, it will be easier to maneuver to a safe berth and be less threat to the environment.

G. Oil spills in harbors, rivers, and open waters: With high pump capacity and large tank recovery space available, many options are available for oil spill recovery that have not been considered due to the restrictions of the prior art methods. I expect a new generation of oil recovery nozzles utilizing the concept of enhanced pump capability and storage capacity.

Small boats can maneuver into shallow areas with the suction end of the hose and recover oil for extended periods of time which will increase their effectiveness and usefulness.

In open waters, a large tank vessel has many advantages aside from the aforementioned. Once on location, it can continue to recover oil indefinitely. It is not subject to the operating criteria of smaller vessels. Large fuel capacities allow a ship to operate for weeks without refueling. Ships can berth and feed a large number of people for weeks.

Large ships can maneuver and operate in very rough seas. This will allow oil recovery operations to continue when currently employed small craft must seek shelter. Large ships have the advantage of becoming the On-Scene Command Center for cleanup operations. Most large ships are equipped with large capacity generators, additional berthing spaces, satellite communications, radars, navigational systems and spotlights. They have a height of eye advantage over smaller craft. Many tank vessels have structures over 125 feet above the water. This allows persons to better observe the oil spill's location and evaluate its movement. The radar can be used at night to facilitate location of the spill and its extent. Equipment and/or people can be landed or removed via helicopter.

One problem that may arise is that some tank vessels have machinery cooling water pipes with hull penetration inlets. The machinery may not be tolerant of oily water circulating as a coolant. In this case, an elbowed flange could be attached which would effectively submerge the inlet another five to fifteen feet below the surface.

BRIEF DESCRIPTION OF THE DRAWINGS

FIG. 1 is a top plan pictorial view of a typical tank vessel equipped with the oil spill recovery apparatus of this invention, illustrating a suction hose and nozzle connected to the vessel tanks and oriented into an oil spill area adjacent the vessel, and further illustrating an optional boom extending across the water's surface;

FIG. 2 is an end elevation cross-sectional view of a tank vessel equipped with the oil spill recovery apparatus of this invention, illustrating the seachest/suction hose adaptor member connected to the vessel's below-waterline seachest, and the suction hose nozzle drawing oil and water into the vessel tanks from the oil and water zone along and beneath the water surface;

FIG. 3 is a front elevation view of a typical seachest strainer plate member, as installed on the vessel's hull below the waterline;

FIG. 4 is a front elevation view of the seachest/suction hose adaptor member of this invention, conditioned for attachment to and the covering of the seachest strainer plate member of FIG. 3;

FIG. 5 is a side elevation view in partial cross-section of the suction hose and seachest/suction hose adaptor of this invention, as attached to the seachest strainer plate member of the vessel, this view taken along line 5—5 of FIG. 4;

FIG. 6 is a side elevation view of a seachest/suction hose adaptor member connecting bolt, including a basal cross-member for insertion through the slotted holes of the seachest strainer plate member;

FIG. 6a is a top plan view of the basal cross-member of the connecting bolt of FIG. 6, illustrating the laterally-disposed upwardly-extending tab elements engaging the slotted holes of the seachest strainer plate member adjacent the slotted hole penetrated by the bolt shaft itself;

FIG. 7 is a side elevation cross-sectional view of a modified seachest/suction hose adaptor member, in which the suction hose fitting is oriented ninety degrees from the perpendicular, enabling forward alignment of the suction hose to reduce drag when connected to a moving vessel;

FIG. 8 is a side elevation cross-sectional view of a modified seachest/suction hose adaptor member, in which the adaptor member housing includes one or more fittings conditioned for connection to a steam line, enabling melting of tar and debris accumulation adjacent the seachest strainer plate member, this view taken along line 8—8 of FIG. 7;

FIG. 9 is a side elevation cross-sectional view of a modified suction hose nozzle, bearing a plurality of inwardly-directed water nozzles to increase the oil and water intake efficiency; and FIG. 10 is a top plan pictorial view of an alternate suction hose displacement arrangement, in which one or more satellite vessels support and position the suction hoses and nozzles over a wider (and/or shallower) area.

DETAILED DESCRIPTION OF A PREFERRED EMBODIMENT

FIG. 1 is a top plan pictorial view of a typical tank vessel 10 equipped with the oil spill recovery apparatus 12 of this invention, illustrating a suction hose 14 and nozzle 16 connected to the vessel tanks 18 and oriented into an oil spill area 20 adjacent the vessel, and further illustrating an optional boom 22 extending across the water's surface. Suction hose 14 may be of any size (e.g., eight inches in diameter) and length, depending upon the particular application.

FIG. 2 is an end elevation cross-sectional view of a tank vessel 10 equipped with the oil spill recovery apparatus 12 of this invention, illustrating the seachest/suction hose adaptor member 24 connected to the vessel's below-waterline seachest 26. The suction hose 14 and nozzle 16 draw oil and water into the vessel tanks 18 from the oil and water zone 28 along and beneath the water surface.

FIG. 3 is a front elevation view of a typical seachest strainer plate member 30, as installed on the vessel's hull 32 below the waterline. Strainer plate 30 is typically connected to the hull by a plurality of bolts 34, and includes an array of slotted holes 36 which serve to prevent passage of debris into the sea chest.

FIG. 4 is a front elevation view of the seachest/suction hose adaptor member 24 of this invention, conditioned for attachment to and the covering of the seachest strainer plate member of FIG. 3. Adaptor member 24 may include a plurality of (preferably four or more) connecting bolts 38, which fasten to the slotted holes of the strainer plate member (described infra).

FIG. 5 is a side elevation view in partial cross-section of the suction hose 14 and seachest/suction hose adaptor 24 of this invention, as attached to the seachest strainer plate member 30 of the vessel, this view taken along line 5—5 of FIG. 4. This view illustrates the connecting bolts 38 extending from the adaptor 24 to and through the slotted holes 36 of the strainer plate.

FIG. 6 is a side elevation view of a seachest/suction hose adaptor member connecting bolt 38, including a shaft 40 and a basal cross-member 48 for insertion through the slotted holes of the seachest strainer plate member. Cross-member 42 may include laterally-disposed and upwardly-extending tab elements 44 to engage adjacent slotted holes of the strainer plate. Shaft 40 may bear an indicator mark 46 corresponding to the alignment of cross-member 42, to facilitate insertion of the cross-member into the slotted holes of the strainer plate.

FIG. 6a is a top plan view of the basal cross-member 42 of the connecting bolt 38 of FIG. 6, illustrating the laterally-disposed upwardly-extending tab elements 44 engaging the slotted holes 36 of the seachest strainer plate member 30 adjacent the slotted hole penetrated by the bolt shaft 40 itself.

FIG. 7 is a side elevation cross-sectional view of a modified seachest/suction hose adaptor member 48, in which the suction hose fitting 50 is oriented ninety degrees from the perpendicular. This orientation enables forward alignment of the suction hose to reduce drag when connected to a moving vessel.

FIG. 8 is a side elevation cross-sectional view of the modified seachest/suction hose adaptor member 48, in which the adaptor member housing also includes one or more steam fittings 52 conditioned for connection to a ship's steam hose. This arrangement enables the melting of any tar and debris accumulation 54 adjacent the seachest strainer plate member 30.

FIG. 9 is a side elevation cross-sectional view of a modified suction hose nozzle 56, bearing a plurality of inwardly-directed water nozzles 58 to increase the oil and water intake efficiency. Nozzles 58 are connected to the tank vessel's existing high-pressure (e.g., 120 psi) water line via hose 60, so no special equipment would be necessary.

FIG. 10 is a top plan pictorial view of an alternate suction hose displacement arrangement, in which one or more satellite vessels 62 support and position the suction hoses and nozzles over a wider (and/or shallower) area. Such a high-volume arrangement is again made possible by the use of the sea chest/suction hose adaptor member 24 enabling access to the tank vessel tanks.

While this invention has been described in connection with preferred embodiments thereof, it is obvious that modifications and changes therein may be made by those skilled in the art to which it pertains without departing from the spirit and scope of the invention. For example, the oil suction hose and/or nozzle may be equipped with a "masher" or "shredder" device to pulverize any solid debris suctioned by the line. In addition, various filters may be installed into the suction hose, nozzle, or adaptor, as necessary or appropriate to insure efficient flow in the system. Accordingly, the scope of this invention is to be limited only by the appended claims.

What is claimed as invention is:

1. A method of recovering oil from the surface of a body of water and into a tank vessel, said tank vessel having a below-waterline seachest member hydraulically connected to at least one internal tank, said method comprising the steps of:
   providing a length of hose for carrying a flow of liquid;
   providing an adaptor member on said hose, said adaptor member constructed and arranged for connection to said tank vessel seachest member; and
   drawing said oil through said hose, said adaptor member, said seachest member, and into said tank vessel internal tank.

2. The method of claim 1 wherein said seachest member includes a strainer plate, and said adaptor member is attached to said strainer plate with bolts.

3. The method of claim 2 wherein said strainer plate includes a plurality of slotted holes, and said bolts extend through and fasten to said slotted holes.

4. The method of claim 1 wherein said adaptor member includes an elbow portion enabling alignment of said hose with said tank vessel orientation.

5. The method of claim 1 wherein said adaptor member includes at least one fitting constructed and arranged for connection to a steam line.

6. The method of claim 1 wherein said hose includes a nozzle member.

7. The method of claim 6 wherein said nozzle member includes at least one water nozzle directed into said hose nozzle member.

8. The method of claim 1 wherein said length of hose is connected to at least one satellite vessel.

* * * * *